(12) United States Patent
Zheng (10) Patent No.: US 9,106,332 B2
(45) Date of Patent: Aug. 11, 2015

(54) DATA SYNCHRONIZATION METHOD AND SYSTEM, AND OPTICAL NETWORK UNIT

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 329 days.

(21) Appl. No.: 13/714,043

(22) Filed: Dec. 13, 2012

(65) Prior Publication Data

US 2013/0101283 A1    Apr. 25, 2013

Related U.S. Application Data

(63) Continuation of application No. PCT/CN2011/073410, filed on Apr. 28, 2011.

(30) Foreign Application Priority Data

Aug. 11, 2010  (CN) .......................... 2010 1 0253722

(51) Int. Cl.
*H04B 10/272* (2013.01)
*H04B 10/038* (2013.01)
*H04J 3/06* (2006.01)
*H04Q 11/00* (2006.01)
*H04B 10/032* (2013.01)

(52) U.S. Cl.
CPC ............ *H04B 10/038* (2013.01); *H04B 10/032* (2013.01); *H04B 10/272* (2013.01); *H04J 3/0641* (2013.01); *H04Q 11/0067* (2013.01); *H04J 2203/006* (2013.01); *H04Q 2011/0081* (2013.01)

(58) Field of Classification Search
None
See application file for complete search history.

(56) References Cited

U.S. PATENT DOCUMENTS

2008/0056721 A1*  3/2008  Mori ............................ 398/100
2009/0067835 A1*  3/2009  Chen ............................. 398/45
2009/0067850 A1*  3/2009  Mizutani et al. ............. 398/154

(Continued)

FOREIGN PATENT DOCUMENTS

CN          101043275 A     9/2007
CN          101150367 A     3/2008

(Continued)

OTHER PUBLICATIONS

English Translation of International Search Report issued in corresponding PCT Application No. PCT/CN2011/073410; mailed Aug. 11, 2011.

(Continued)

*Primary Examiner* — Ken Vanderpuye
*Assistant Examiner* — Merlin Brito Peguero
(74) *Attorney, Agent, or Firm* — Brinks Gilson & Lione (57) ABSTRACT

Embodiments of the present disclosure provide a data synchronization method and system, and an optical network unit. An ONU receives synchronization data that is transmitted by a first OLT through a GEM port corresponding to a predetermined GEM port ID or a logical link corresponding to a predetermined LLID, and stores the synchronization data. When a fault occurs on the first OLT or on a backbone optical fiber connected to the first OLT, the ONU transmits the synchronization data to a second OLT so that the second OLT recovers services according to the synchronization data.

15 Claims, 5 Drawing Sheets

(56) References Cited

U.S. PATENT DOCUMENTS

| | | | |
|---|---|---|---|
| 2009/0263122 A1* | 10/2009 | Helkey et al. ............... | 398/7 |
| 2010/0098407 A1* | 4/2010 | Goswami et al. ............ | 398/5 |
| 2010/0166419 A1 | 7/2010 | Elmoalem et al. | |
| 2010/0272259 A1* | 10/2010 | Kim et al. ................... | 380/256 |
| 2010/0310252 A1* | 12/2010 | Healey ........................ | 398/6 |
| 2011/0013903 A1* | 1/2011 | Rafel Porti et al. .......... | 398/1 |
| 2013/0266306 A1* | 10/2013 | Kozaki et al. ............... | 398/5 |

FOREIGN PATENT DOCUMENTS

| | | |
|---|---|---|
| CN | 101489154 A | 7/2009 |
| CN | 101562480 A | 10/2009 |
| CN | 101651912 A | 2/2010 |
| CN | 101667862 A | 3/2010 |
| EP | 2159937 A1 | 3/2010 |
| JP | 2007-35160 A | 12/2007 |
| JP | 2007325160 A | 12/2007 |

OTHER PUBLICATIONS

Series G: Transmission Systems and Media, Digital Systems and Networks—Digital Sections and Digital Line System—Optical Line Systems for Local and Access Networks "Gigabit-capable Passive Optical Networks (G-Pon): Transmission Convergence Layer Specification." Telecommunications Standardization Sector of ITU. Feb. 2004.

"Series G: Transmission Systems and Media, Digital Systems and Networks—Digital Sections and Digital Line System—Optical Line Systems for Local and Access Networks Gigabit-capable Passive Optical Networks (G-Pon): General Characteristics." Telecommunications Standardization Sector of ITU. Mar. 2008.

Extended European Search Report issued in corresponding European Patent Application No. 11780141.5, mailed Aug. 26, 2013, 7 pages.

Written Opinion of the International Searching Authority issued in corresponding PCT Patent Application No. PCT/CN2011/073410, mailed Aug. 11, 2011, 4 pages.

ITU-T, "Gigabit-capable Passive Optical Networks (G-PON): Transmission Convergence Layer Specification" Series G: Transmission Systems and Media, Digital Systems and Networks. G.984.3, Aug. 2008, 144 pages.

* cited by examiner

DATA SYNCHRONIZATION METHOD AND SYSTEM, AND OPTICAL NETWORK UNIT

CROSS-REFERENCE TO RELATED APPLICATIONS

This application is a continuation of International Application No. PCT/CN2011/073410, filed on Apr. 28, 2011, which claims priority to Chinese Patent Application No. 201010253722.X, filed on Aug. 11, 2010, both of which are hereby incorporated by reference in their entireties.

FIELD OF TECHNOLOGY

Embodiments of the present disclosure relate to the field of communications technologies, and in particular, to a data synchronization method and system, and an optical network unit (ONU).

BACKGROUND

A passive optical network (PON) is a point to point optical access technology. A PON includes an optical line terminal (OLT), an optical splitter, an ONU and an optical fiber connecting these devices. The OLT is connected to an optical splitter by using a backbone optical fiber, and the optical splitter is connected to ONUs respectively by using multiple branch optical fibers.

Figure 1:
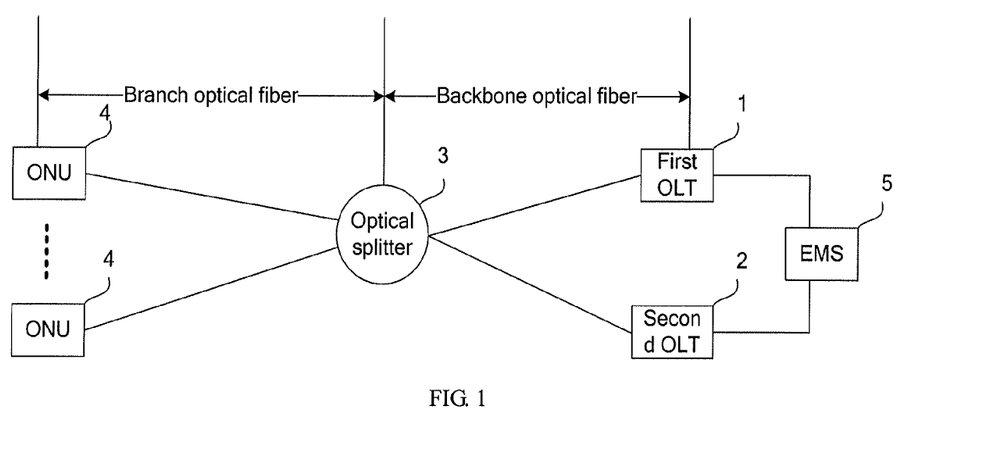
FIG. 1 is a schematic structural diagram of OLTs and ONUs in the prior art.

To ensure that services can still be performed normally when a fault occurs on the OLT, two OLTs may be used for backup. FIG. 1 is a schematic structural diagram of OLTs and ONUs in the prior art. In FIG. 1, a first OLT1 and a second OLT2 each are connected to an optical splitter 3 by using an independent backbone optical fiber. The optical splitter 3 is connected to each ONU4 by using a branch fiber. The first OLT1 and the second OLT2 both communicate with an element management system (EMS) 5. In normal cases, the first OLT1 communicates with each ONU4. When detecting that a fault occurs on the first OLT1, the EMS5 instructs the second OLT2 to serve as a master OLT and transmits synchronization data of the first OLT1 to the second OLT2 so that the second OLT2 communicates with each ONU. The synchronization data refers to all types of data needed for communication between the second OLT2 and each ONU, for example, an identification of each ONU (ONU ID), and a serial number of each ONU.

The data synchronization method in the prior art has the following problems: each OLT communicates with the EMS based on the Simple Network Management Protocol (SNMP), and the speed of data transmission is slow; and each OLT and the EMS are far from each other physically, and interaction data may need to span multiple switch devices. If a fault occurs on one of the switch devices, the communication between the OLT and the EMS cannot be performed, resulting in that data synchronization cannot be implemented. As a result, the reliability of the data synchronization method is not high.

SUMMARY

Embodiments of the present disclosure provide a data synchronization method and system, and an optical network unit to solve the problem in the prior art that the speed of data synchronization between a master OLT and a standby OLT is slow and the reliability is not high when a fault occurs on the master OLT or on a backbone optical fiber connected to the master OLT. In this way, the speed of data synchronization between the master OLT and the standby OLT is improved, and the reliability of data synchronization is enhanced.

According to a first aspect of the present disclosure, a data synchronization method is provided. The method includes: receiving, by an ONU, synchronization data that is transmitted by a first OLT through a GEM port corresponding to a predetermined GEM port identification or a logical link corresponding to a predetermined logical link identification, and storing the synchronization data. When a fault occurs on the first OLT or on a backbone optical fiber connected to the first OLT, the ONU transmits the synchronization data to a second OLT so that the second OLT recovers services according to the synchronization data.

According to a second aspect of the present disclosure, another data synchronization method is provided. The method includes: receiving, by a first ONU, synchronization data that is transmitted by a first OLT through a GEM port corresponding to a predetermined GEM port identification or a logical link corresponding to a predetermined logical link identification; returning, by the first ONU, the synchronization data to the first OLT so that a second OLT obtains the synchronization data by interception; and when a fault occurs on the first OLT or on a backbone optical fiber connected to the first OLT, recovering, by the second OLT, services according to the synchronization data.

According to a third aspect of the present disclosure, an ONU is provided. The ONU includes: a receiving module, a storing module, and a first processing module. The receiving module is configured to receive synchronization data that is transmitted by a first OLT through a GEM port corresponding to a predetermined GEM port identification or a logical link corresponding to a predetermined logical link identification. The storing module is configured to store the synchronization data. The first processing module is configured to transmit the synchronization data to a second OLT so that the second OLT recovers services according to the synchronization data when a fault occurs on the first OLT or on a backbone optical fiber connected to the first OLT.

According to a fourth aspect of the present disclosure, another ONU is provided. The ONU includes: a receiving module, configured to receive synchronization data that is transmitted by a first OLT through a GEM port corresponding to a predetermined GEM port identification or a logical link corresponding to a predetermined logical link identification; and a second processing module, configured to return the synchronization data to the first OLT so that a second OLT obtains the synchronization data by interception.

According to a fifth aspect of the present disclosure, a data synchronization system is provided. The system includes a first OLT, a second OLT, and an ONU, where: the first OLT is configured to transmit synchronization data through a GEM port corresponding to a predetermined GEM port identification or a logical link corresponding to a predetermined logical link identification; the ONU is configured to receive the synchronization data and store the synchronization data, and transmit the synchronization data to the second OLT when a fault occurs on the first OLT or on a backbone optical fiber connected to the first OLT; and the second OLT is configured to recover services according to the synchronization data when a fault occurs on the first OLT or on the backbone optical fiber connected to the first OLT.

According to a sixth aspect of the present disclosure, another data synchronization system. The system includes a first OLT, a second OLT, and an ONU, where: the first OLT is configured to transmit synchronization data through a GEM port corresponding to a predetermined GEM port identification or a logical link corresponding to a predetermined logical link identification; the ONU is configured to return the synchronization data to the first OLT after receiving the synchronization data; and the second OLT is configured to obtain the synchronization data by interception, and recover services according to the synchronization data when a fault occurs on the first OLT or on a backbone optical fiber connected to the first OLT.

In the embodiments of the present disclosure, the first ONU receives synchronization data that is transmitted by the first OLT through a GPON encapsulation method port corresponding to a predetermined GPON encapsulation method port identification or a logical link corresponding to a predetermined logical link identification; and the first ONU transmits the synchronization data to the second OLT without parsing the synchronization data. The speed of data transmission between the first OLT and the first ONU is higher than that between the OLT and the EMS. Therefore, compared with the prior art, the speed of data transmission is improved. In addition, the first OLT and the first ONU are connected through an optical fiber, and no switch device is deployed there between. Therefore, the probability that data synchronization fails to be implemented due to a fault on an intermediate switch device is lowered, and thereby the reliability of data synchronization is improved.

BRIEF DESCRIPTION OF THE DRAWINGS

To illustrate the solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art can derive other drawings from these accompanying drawings without creative efforts.

DETAILED DESCRIPTION

To make the objectives, solutions, and advantages the present disclosure more comprehensible, the following clearly and completely describes the solutions according to the embodiments of the present disclosure with reference to the accompanying drawings in the embodiments of the present disclosure. Apparently, the embodiments in the following description are merely a part of rather than all the embodiments of the present disclosure. All other embodiments obtained by persons of ordinary skill in the art based on the embodiments of the present disclosure without creative efforts shall fall within the protection scope of the present disclosure.

Figure 2:
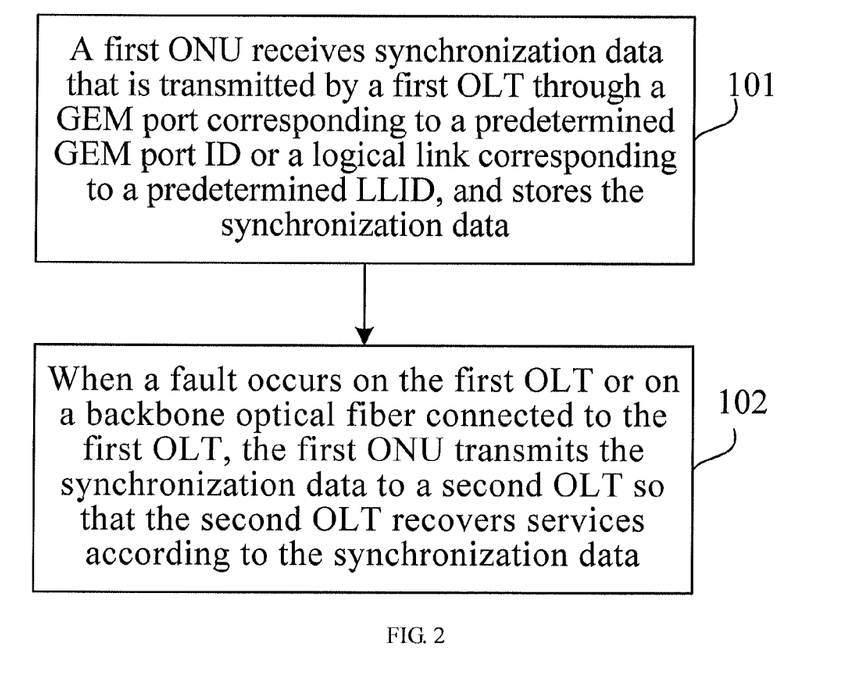
FIG. 2 is a flow chart of a data synchronization method according to a first embodiment of the present disclosure.

FIG. 2 is a flow chart of a data synchronization method according to a first embodiment of the present disclosure, including:

Step 101: A first ONU receives synchronization data that is transmitted by a first OLT through a GEM port corresponding to a predetermined GPON encapsulation method (GEM) port identification or a logical link corresponding to a predetermined logical link identification (LLID), and stores the synchronization data.

Generally, different GEM port IDs or LLIDs indicate different functions. In each embodiment of the present disclosure, a specific GEM port ID or LLID may be predetermined, and the predetermined GEM port ID or LLID is dedicatedly used for transmission of the synchronization data.

The data synchronization may be implemented by extending the PLOAM/OMCI protocol (for the GPON standard), or may be implemented by extending Ethernet OAM (for the EPON standard).

In this embodiment of the present disclosure, the first ONU may be one of multiple ONUs communicating with the first OLT and a second OLT. The first ONU is different from other ONUs. The first ONU is a predetermined ONU for transmitting the synchronization data. The number of predetermined first ONUs for transmitting the synchronization data may be one or multiple.

Step 102: When a fault occurs on the first OLT or on a backbone optical fiber connected to the first OLT, the first ONU transmits the synchronization data to a second OLT so that the second OLT recovers services according to the synchronization data.

Step 102 may include: when a fault occurs on the first OLT or on the backbone optical fiber connected to the first OLT, registering, by the first ONU, with the second OLT; after the registration is successful, transmitting, by the first ONU, the synchronization data to the second OLT.

The synchronization data may include a serial number of the ONU, an ONU identification (ONU ID), an allocation identification (Alloc-ID), ranging time (Ranging time), the GEM port, and the like.

In the foregoing embodiment, after the first ONU receives the synchronization data that is transmitted through the GEM port corresponding to the predetermined GEM port ID or the logical link corresponding to the predetermined LLID, the first ONU does not need to parse the synchronization data according to a specific synchronization protocol, but can directly transmit the synchronization data to the second OLT, thereby achieving a high synchronization speed.

The data synchronization method provided in this embodiment is transparent to synchronization protocols between the first OLT and the second OLT, shielding differences and similarities of various synchronization protocols. Therefore, the synchronization data transmission between the first OLT and the second OLT by the first ONU may be based on any synchronization protocol, for example, the Bidirectional Forwarding Detection (BFD) protocol, the Virtual Router Redundancy Protocol (VRRP), and the Inter-Chassis Communication Protocol (ICCP).

The first OLT and the first ONU are connected through an optical fiber, and no switch device is deployed there between. Therefore, the probability that data synchronization fails to be implemented due to a fault on an intermediate switch device is lowered, and thereby the reliability of data synchronization is improved.

In addition, the first ONU does not parse the synchronization data. Therefore, no matter which protocol the synchronization data transmission between the first OLT and the second OLT is based on, the first ONU does not need to have the function of parsing the synchronization data transmitted between the first OLT and the second OLT, thereby reducing the requirement for the first ONU.

Figure 3:
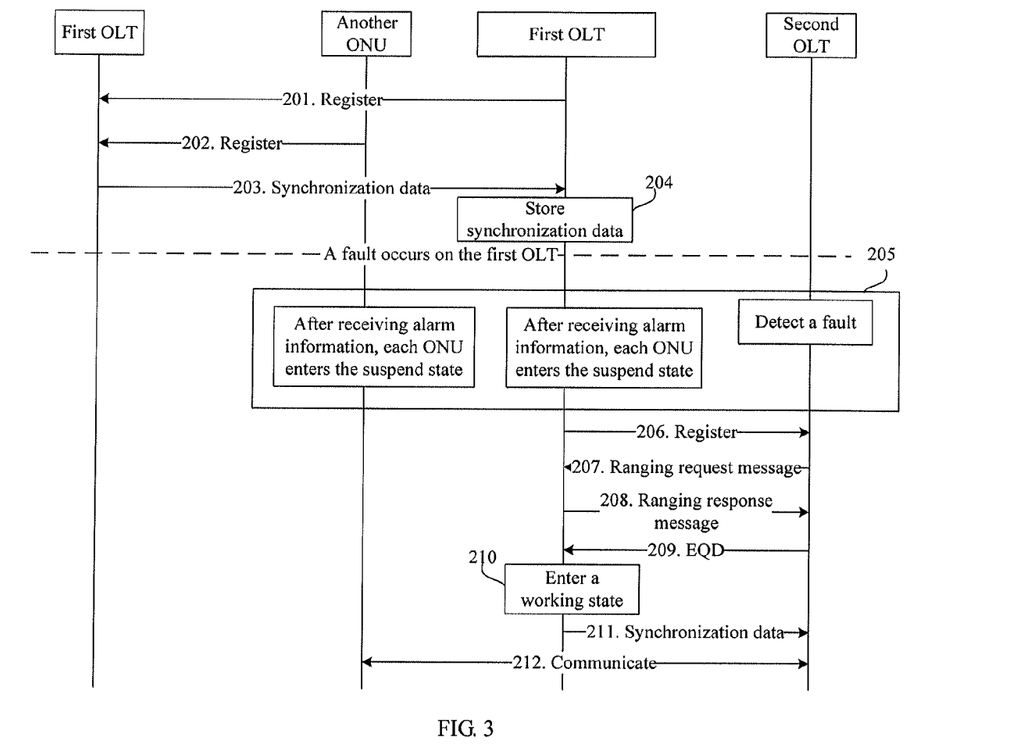
FIG. 3 is a flow chart of a data synchronization method according to a second embodiment of the present disclosure.

FIG. 3 is a flow chart of a data synchronization method according to a second embodiment of the present disclosure. This flow chart mainly includes two parts: steps before a fault occurs and steps after a fault occurs.

The steps before a fault occurs mainly include:

Step 201: The first ONU servers as a predetermined ONU for transmitting synchronization data, and registers with a first OLT. In this embodiment, the first OLT is a master OLT and a second OLT is a standby OLT.

Step 202: Another ONU except the first ONU registers with the first OLT.

Step 203: The first OLT periodically or randomly transmits synchronization data to the first ONU, where the synchronization data may be transmitted to the first ONU after being encrypted.

Step 204: The first ONU stores the synchronization data.

The steps after a fault occurs include:

Step 205: The second OLT detects that a fault occurs on the first OLT or on a backbone optical fiber connected to the first OLT.

The second OLT may determine that a fault occurs on the first OLT or on the backbone optical fiber connected to the first OLT if no synchronization data transmitted by the first OLT is received within a specific period.

Alternatively, the second OLT may determine that a fault occurs on the first OLT or on the backbone optical fiber connected to the first OLT by detecting a BFD packet borne in a tunnel corresponding to a GEM port ID or an LLID. For example, the second OLT determines that a fault occurs on the first OLT or on the backbone optical fiber connected to the first OLT when no BFD packet from the first OLT is received within a specific period.

In addition, the first ONU and another ONU except the first ONU can also receive alarm information, where the alarm information is used to indicate that a fault occurs on the first OLT or on the backbone optical fiber connected to the first OLT. After receiving the alarm information, each of the ONUs enters a suspend state (POPUP).

Step 206: The first ONU registers with the second OLT.

Step 207: The second OLT sends a ranging request message to the first ONU.

Step 208: The first ONU sends a ranging response message to the second OLT.

Step 209: The second OLT calculates an EQD, and sends the EQD to the first ONU.

Step 210: The first ONU enters an operation state (OPERATION).

Step 211: The first ONU transmits synchronization data stored therein to the second OLT.

Step 212: The second OLT communicates with another ONU according to the synchronization data. The ONUs communicating with the first OLT before a fault occurs on a first working port of the first OLT are capable of communicating with the second OLT after a fault occurs on the first working port of the first OLT. The second OLT may configure each of the ONUs and recover service transmission.

Figure 4:
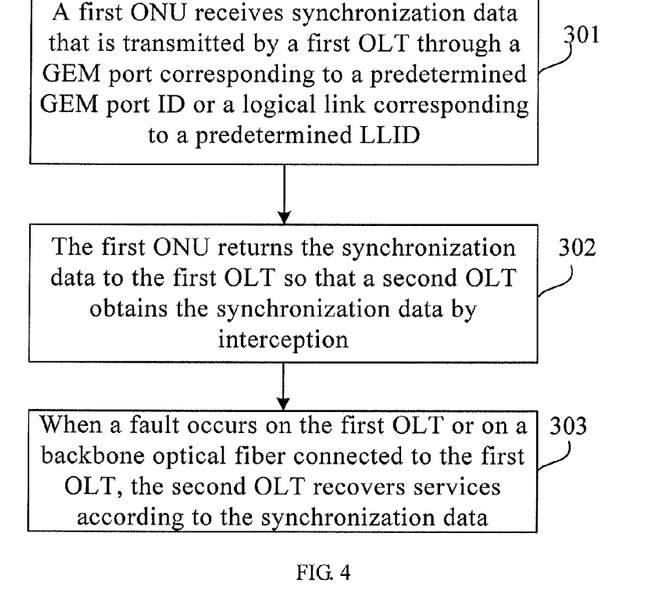
FIG. 4 is a flow chart of a data synchronization method according to a third embodiment of the present disclosure.

FIG. 4 is a flow chart of a data synchronization method according to a third embodiment of the present disclosure, including:

Step 301: A first ONU receives synchronization data that is transmitted by a first OLT through a GEM port corresponding to a predetermined GEM port ID or a logical link corresponding to a predetermined LLID.

Step 302: The first ONU returns the synchronization data to the first OLT so that a second OLT obtains the synchronization data by interception.

Step 303: When a fault occurs on the first OLT or on a backbone optical fiber connected to the first OLT, the second OLT recovers services according to the synchronization data.

The difference between the third embodiment and the first embodiment is that: In the first embodiment, the first ONU stores the synchronization data, and transmits the synchronization data to the second OLT when a fault occurs on the first OLT or on the backbone optical fiber connected to the first OLT. In the third embodiment, the first ONU does not store the synchronization data. Once receiving the synchronization data, the synchronization data is returned to the first OLT so that the second OLT may obtain the synchronization data by interception. Once a fault occurs on the first OLT or on the backbone optical fiber connected to the first OLT, the second OLT may communicate with another ONU according to the synchronization data stored in the second OLT.

Figure 5:
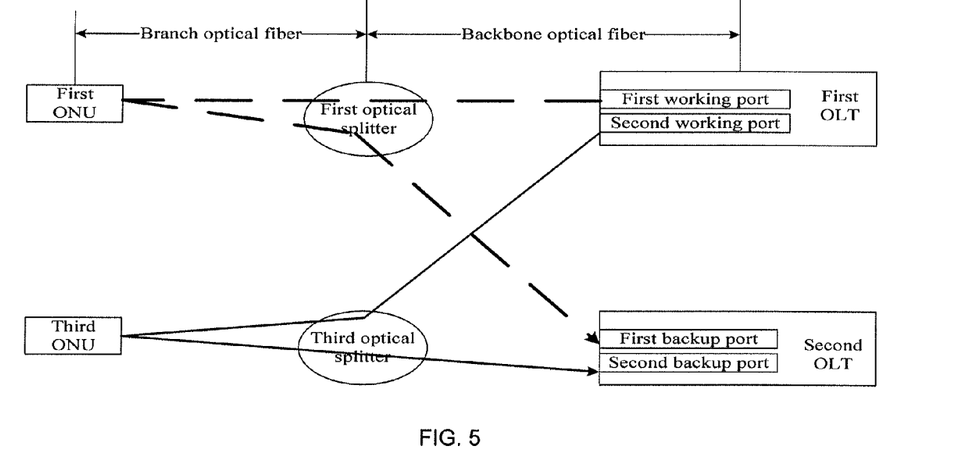
FIG. 5 is a schematic diagram of a data synchronization method according to a fourth embodiment of the present disclosure.

FIG. 5 is a schematic diagram of a data synchronization method according to a fourth embodiment of the present disclosure. In this embodiment, a first OLT and a second OLT are both connected to a first ONU. The first OLT and the second OLT are both connected to a third ONU. The first ONU and the third ONU are connected to the first OLT by using different optical splitters. The first ONU and the third ONU are connected to the second OLT by using different optical splitters. The first ONU is connected to the first OLT and the second OLT by using a first optical splitter, and the third ONU is connected to the first OLT and the second OLT by using a third optical splitter.

Before a fault occurs on the first OLT or on the backbone optical fiber connected to the first OLT, the first OLT transmits synchronization data to the first ONU through a first working port, the first ONU returns the synchronization data to the first OLT, and the second OLT obtains the synchronization data from the first OLT by intercepting a first backup port of the second OLT. After a fault occurs on the first OLT or on the backbone optical fiber connected to the first OLT, the first OLT may transmit the synchronization data to the third ONU through a second working port, the third ONU returns and uploads the synchronization data to the first OLT, and the second OLT obtains the synchronization data from the first OLT by intercepting a second backup port of the second OLT.

This method is not only applicable to synchronization before a fault occurs on the backbone optical fiber or on the master OLT, but also considers the real-time synchronization requirement after a fault occurs on the backbone optical fiber or on the master OLT.

For example, as regards the third embodiment, during the process of recovering services by the second OLT according to the synchronization data, if a new ONU is added to the optical network, the first ONU does not have sufficient time to synchronize synchronization data related to the new ONU to the second OLT before a fault occurs on the backbone optical fiber or on the first OLT. In this case, the third ONU may synchronize the synchronization data of the first OLT to the second OLT, so as to ensure that the second OLT is capable of recovering communication with the new ONU.

For another example, because the second OLT takes a longer time to recover communication with each of the ONUs, and an equalization delay (EQD) is ranging information sensitive to time, after a fault occurs on the first OLT or on the backbone optical fiber connected to the first OLT, the third ONU may synchronize the ranging information to the second OLT through a second backup port of the second OLT.

Through the foregoing method, transmission of the synchronization data during the period of fault recovery of the second OLT is ensured when a fault occurs on the first OLT or on the backbone optical fiber connected to the first OLT, and it is ensured that communication between the second OLT and each of the ONUs is recovered quickly.

Figure 6:
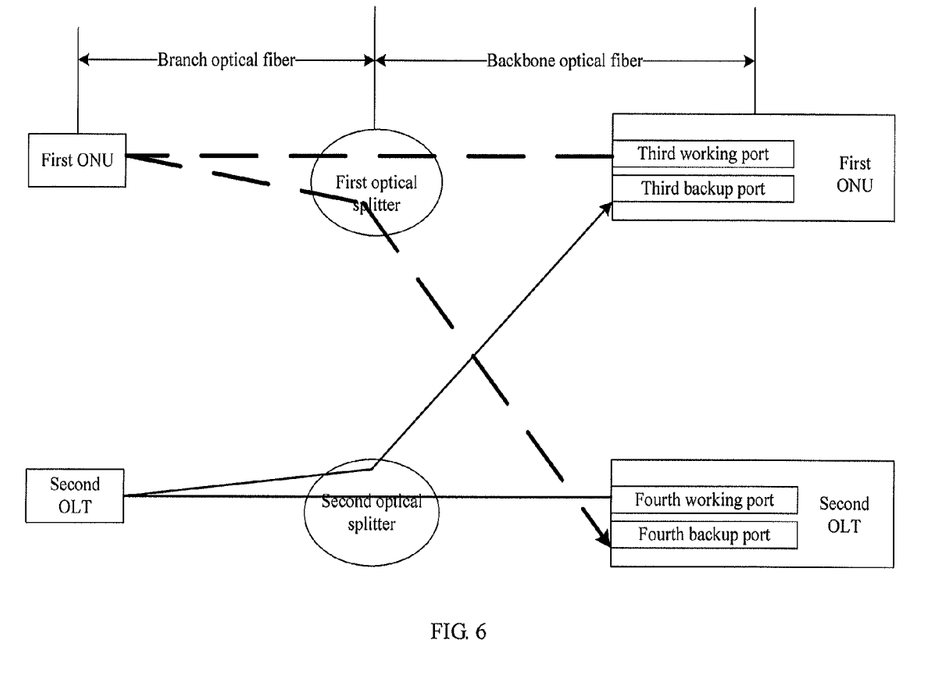
FIG. 6 is a schematic diagram of a data synchronization method according to a fifth embodiment of the present disclosure.

FIG. 6 is a schematic diagram of a data synchronization method according to a fifth embodiment of the present disclosure. In this embodiment, after a first OLT transmits synchronization data to a second OLT by using a first ONU, the second OLT may transmit response data to the first OLT by using a second ONU, which indicates that the second OLT has received the synchronization data transmitted by the first OLT. The first OLT and the second OLT may be connected to the first ONU by using a first optical splitter. The first OLT, the first optical splitter, the first ONU, and the second OLT form a data channel over which data is transmitted from the first OLT to the second OLT. The first OLT and the second OLT may be connected to the second ONU by using a second optical splitter. The first OLT, the second optical splitter, the second ONU, and the second OLT form a channel over which data is transmitted from the second OLT to the first OLT. In an optical network system, the direction of the data transmission is normally from a working port to a backup port. Each of the OLTs may reserve a specific port used as a backup port of another OLT.

The first OLT transmits the synchronization data to the first ONU through a third working port, the first ONU returns and uploads the synchronization data to the first OLT, and the second OLT obtains the synchronization data from the first OLT by intercepting a fourth backup port of the second OLT. Afterwards, the second OLT transmits the response data to the second ONU through a fourth working port, the second ONU returns and uploads the synchronization data to the second OLT, and the first OLT obtains the synchronization data from the second OLT by intercepting a third backup port of the first OLT.

Alternatively, before a fault occurs, the first ONU stores the synchronization data from the first OLT. After a fault occurs, the first ONU transmits the synchronization data to the second OLT. Afterwards, the second OLT transmits the response data to the second ONU through a fourth working port, the second ONU returns and uploads the response data to the second OLT, and the first OLT obtains the response data from the second OLT by intercepting a third backup port of the first OLT.

The response data may be transmitted through a GEM port corresponding to a predetermined GEM port ID or a logical link corresponding to a predetermined LLID.

In a practical system, generally, the first OLT is responsible for communicating with a part of ONUs, and the second OLT is responsible for communicating with the other part of ONUs. The first OLT may transmit the synchronization data to the second OLT so that when a fault occurs on the first OLT, the second OLT may communicate with, according to the synchronization data, each of the ONUs that originally communicates with the first OLT. Similarly, the second OLT may also transmit the synchronization data to the first OLT so that after a fault occurs on the second OLT, the first OLT may communicate with, according to the synchronization data, each of the ONUs that originally communicates with the second OLT. That is to say, the first OLT and the second OLT may back up the synchronization data for each other.

In the foregoing embodiments, the synchronization data transmitted by the first OLT to the first ONU may be encrypted synchronization data. The first ONU does not need to decrypt the data. After receiving the synchronization data, the second OLT may perform decryption according to an encryption and decryption method predetermined with the first OLT.

The method provided in each of the foregoing embodiments of the present disclosure may be applied to a gigabit passive optical network (GPON), and may also be applied to an Ethernet passive optical network (EPON). To support long-distance transmission between an OLT and an ONU, an optical power amplifier may be added on an optical transmission channel. The network where the optical power amplifier is added becomes an active optical network. The method according to the embodiment of the present disclosure can also be applied to the active optical network.

Figure 7:
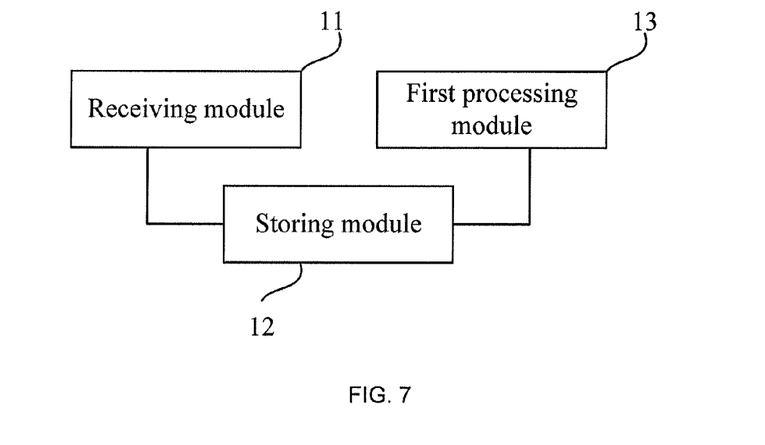
FIG. 7 is a schematic structural diagram of an ONU according to a first embodiment of the present disclosure.

FIG. 7 is a schematic structural diagram of an ONU according to a first embodiment of the present disclosure. The ONU includes a receiving module 11, a storing module 12, and a first processing module 13. The receiving module 11 is configured to receive synchronization data that is transmitted by a first OLT through a GEM port corresponding to a predetermined GEM port ID or a logical link corresponding to a predetermined LLID. The storing module 12 is configured to store the synchronization data received by the receiving module 11. The first processing module 13 is configured to: when a fault occurs on the first OLT or on a backbone optical fiber connected to the first OLT, transmit the synchronization data stored by the storing module 12 to a second OLT so that the second OLT recovers services according to the synchronization data.

The first processing module 13 may be configured to: when a fault occurs on the first OLT or on the backbone optical fiber connected to the first OLT, register with the second OLT, and after the registration is successful, transmit the synchronization data stored by the storing module 12 to the second OLT so that the second OLT recovers services according to the synchronization data.

Figure 8:
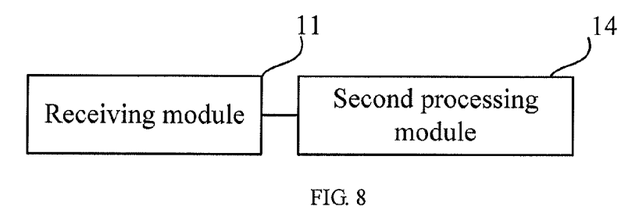
FIG. 8 is a schematic structural diagram of an ONU according to a second embodiment of the present disclosure.

FIG. 8 is a schematic structural diagram of an ONU according to a second embodiment of the present disclosure. The ONU includes a receiving module 11 and a second processing module 14. The receiving module 11 is configured to receive synchronization data that is transmitted by a first OLT through a GPON encapsulation method port corresponding to a predetermined GPON encapsulation method port identification or a logical link corresponding to a predetermined logical link identification. The second processing module 14 is configured to return the synchronization data received by the receiving module 11 to the first OLT so that a second OLT obtains the synchronization data by interception.

The second processing module 14 may be configured to return the synchronization data received by the receiving module 11 to the first OLT by using a first optical splitter so that the second OLT obtains the synchronization data by interception.

An embodiment of the present disclosure further provides a data synchronization system. The system may include the ONU shown in FIG. 7, a first OLT, and a second OLT, where both the first OLT and the second OLT communicate with the ONU shown in FIG. 7. The first OLT is configured to transmit synchronization data through a GPON encapsulation method port corresponding to a predetermined GPON encapsulation method port identification or a logical link corresponding to a predetermined logical link identification. The ONU is configured to receive the synchronization data and store the synchronization data, and transmit the synchronization data to the second OLT when a fault occurs on the first OLT or on a backbone optical fiber connected to the first OLT. The second OLT is configured to recover services according to the synchronization data when a fault occurs on the first OLT or on the backbone optical fiber connected to the first OLT.

The system may further include a first optical splitter. The first OLT communicates with the ONU shown in FIG. 8 by using the first optical splitter. The ONU shown in FIG. 7 is configured to transmit the synchronization data to the first optical splitter through a first working port. The first optical splitter is configured to transmit the synchronization data to the second OLT.

The system may further include a second ONU and a second optical splitter. The second ONU separately communicates with the first OLT and the second OLT by using the second optical splitter, and is configured to receive, by using the second optical splitter, response data that is transmitted by the second OLT through a second working port, and return the response data to the second OLT by using the second optical splitter so that the first OLT obtains the response data by intercepting a first backup port. For the specific structure, reference may be made to FIG. 6.

An embodiment of the present disclosure further provides a data synchronization system. The system may include the ONU shown in FIG. 8, a first OLT, and a second OLT, where both the first OLT and the second OLT communicate with the ONU shown in FIG. 8. The first OLT is configured to transmit synchronization data through a GPON encapsulation method port corresponding to a predetermined GPON encapsulation method port identification or a logical link corresponding to a predetermined logical link identification. The ONU is configured to return the synchronization data to the first OLT after receiving the synchronization data. The second OLT is configured to obtain the synchronization data by interception, and recover services according to the synchronization data when a fault occurs on the first OLT or on a backbone optical fiber connected to the first OLT.

The system may further include a first optical splitter. The first OLT communicates with the ONU shown in FIG. 8 by using the first optical splitter. The first optical splitter may be configured to receive the synchronization data returned by the ONU. The ONU shown in FIG. 8 is configured to transmit the synchronization data to the first optical splitter through a first working port. The first optical splitter returns the synchronization data to the first OLT so that the second OLT obtains the synchronization data by intercepting a second backup port.

The system may further include a second ONU and a second optical splitter. The second ONU separately communicates with the first OLT and the second OLT by using the second optical splitter, and is configured to receive, by using the second optical splitter, response data transmitted by the second OLT through a second working port, and return the response data to the second OLT by using the second optical splitter so that the first OLT obtains the response data by intercepting a first backup port. For the specific structure, reference may be made to FIG. 6. The third working port shown in FIG. 6 is equivalent to the first working port in this embodiment. The fourth working port shown in FIG. 6 is equivalent to the second working port in this embodiment.

The system may further include a third ONU and a third optical splitter. The third ONU separately communicates with the first OLT and the second OLT by using the third optical splitter, and is configured to: after a fault occurs on the first working port of the first OLT, receive synchronization data transmitted by the first OLT through the second working port on which no fault has occurred, and return the synchronization data to the first OLT so that the second OLT obtains the synchronization data by intercepting a second backup port. For the specific structure, reference may be made to FIG. 5.

Figure 9:
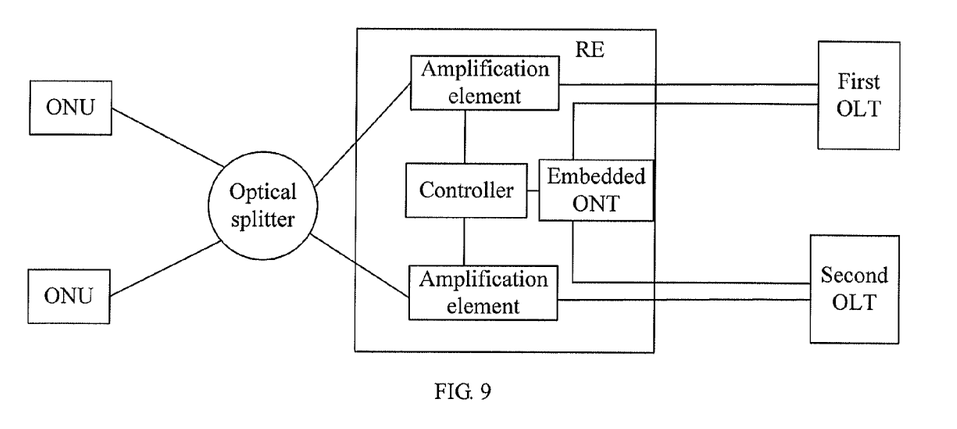
FIG. 9 is a schematic structural diagram of a data synchronization system according to an embodiment of the present disclosure.

FIG. 9 is a schematic structural diagram of a data synchronization system according to an embodiment of the present disclosure. In this embodiment, a reach extender (RE) is connected between a first OLT and a first optical splitter. An ONT is embedded in the RE. The first OLT and a second OLT may control amplification elements in the RE by using the embedded ONT. In this embodiment, the synchronization data of the first OLT may be transmitted to the embedded ONT, and the embedded ONT transmits the synchronization data to the second OLT.

Persons of ordinary skill in the art should understand that all or part of the steps of the method in the embodiments may be implemented by a program instructing relevant hardware such as a hardware processor. The program may be stored in a computer readable storage medium that is accessible to the hardware processor. When the program runs, the above steps of the methods in the embodiments are performed. The storage medium may be any medium capable of storing program codes, such as ROM, RAM, magnetic disk, or optical disk, and like.

Finally, it should be noted that the above embodiments are merely intended for describing the solutions of the present disclosure other than limiting the present disclosure. Although the present disclosure is described in detail with reference to the foregoing embodiments, persons of ordinary skill in the art should understand that they can still make modifications to the solutions described in the foregoing embodiments or make equivalent substitutions to some features thereof, without departing from the spirit and scope of the solutions of the embodiments of the present disclosure.

What is claimed is:

1. A data synchronization method, comprising:
    receiving, by an optical network unit (ONU), synchronization data that is transmitted by a first optical line terminal (OLT) through a gigabit passive optical network encapsulation method (GEM) port corresponding to a predetermined GEM port identification or a logical link corresponding to a predetermined logical link identification (LLID), and storing the synchronization data; wherein the predetermined GEM port identification, or the LLID, is dedicated for use for transmission of the synchronization data; and
    when a fault occurs on the first OLT or on a backbone optical fiber connected to the first OLT, transmitting, by the ONU, the synchronization data to a second OLT without parsing the synchronization data, so that the second OLT recovers services according to the synchronization data.

2. The method according to claim 1, wherein transmitting, by ONU, the synchronization data to a second OLT comprises:
    registering, by the ON U, with the second OLT; and
    when the registration is successful, transmitting, by the ONU, the synchronization data to the second OLT.

3. The method according to claim 1, wherein receiving, by a ONU, synchronization data that is transmitted by a first OLT through a GEM port corresponding to a predetermined GEM port identification or a logical link corresponding to a predetermined logical link identification (LLD) comprises:
    receiving, by the ONU, encrypted synchronization data that is transmitted by the first OLT through the GEM port corresponding to the predetermined GEM port identification or the logical link corresponding to the predetermined LLID.

4. The method according to claim 2, wherein receiving, by a ONU, synchronization data that is transmitted by a first OLT through a GEM port corresponding to a predetermined GEM port identification or a logical link corresponding to a predetermined LLD comprises:
receiving, by the ONU, encrypted synchronization data that is transmitted by the first OLT through the GEM port corresponding to the predetermined GEM port identification or the logical link corresponding to the predetermined LLID.

5. A data synchronization method, comprising:
receiving, by a first optical network unit (ONU), synchronization data that is transmitted by a first optical line terminal (OLT) through a gigabit passive optical network encapsulation method (GEM) port corresponding to a predetermined GEM port identification or a logical link corresponding to a predetermined logical link identification (LLID); wherein the predetermined GEM port identification, or the LLID, is dedicated for use for transmission of the synchronization data;
returning, by the first ONU, the synchronization data to the first OLT without parsing the synchronization data, so that a second OLT obtains the synchronization data by interception.

6. The method according to claim 5, wherein returning, by first ONU, the synchronization data to the first OLT comprises:
returning, by the first ONU, the synchronization data to the first OLT by using a first optical splitter.

7. The method according to claim 6, further comprising:
transmitting, by the OLT, response data to a second ONU through the GEM port corresponding to the predetermined GEM port identification or the logical link corresponding to the predetermined LLID after obtaining the synchronization data by interception; and
returning, by the second GNU, the response data to the second OLT so that the first OLT obtains the response data by interception.

8. The method according to claim 7, wherein returning, by the second ONU, the response data to the second OLT comprises:
returning, by the second ONU, the response data to the second OLT by using a second optical splitter.

9. An optical network unit, comprising:
a receiving module, configured to receive synchronization data that is transmitted by a first optical line terminal (OLT) through a gigabit passive optical network encapsulation method (GEM) port corresponding to a predetermined GEM port identification or a logical link corresponding to a predetermined logical link identification (LLID); wherein the predetermined GEM port identification, the LLID, is dedicated for use for transmission of the synchronization data;
a storing module, configured to store the synchronization data; and
a first processing module, configured to: when a fault occurs on the first OLT or on a backbone optical fiber connected to the first OLT, transmit the synchronization data to a second OLT without parsing the synchronization data, so that the second OLT recovers services according to the synchronization data.

10. The optical network unit according to claim 9, wherein the first processing module is configured to:
when a fault occurs on the first OLT or on the backbone optical fiber connected to the first OLT, register with the second OLT, and when the registration is successful, transmit the synchronization data to the second OLT so that the second OLT recovers services according to the synchronization data.

11. An optical network unit, comprising:
a receiving module, configured to receive synchronization data that is transmitted by a first optical line terminal (OLT) through a gigabit passive optical network encapsulation method (GEM) port corresponding to a predetermined GEM port identification or a logical link corresponding to a predetermined logical link identification (LLID); wherein the predetermined GEM port identification or the LLID, is dedicatedly used for transmission of the synchronization data; and
a second processing module, configured to return the synchronization data to the first OLT without parsing the synchronization data, so that a second OLT obtains the synchronization data by interception.

12. The optical network unit according to claim 11, wherein the processing module is configured to return the synchronization data to the first OLT by using an optical splitter, so that the second OLT obtains the synchronization data by interception.

13. A data synchronization system, comprising a first optical line terminal (OLT), a second OLT, and an optical network unit (ONU), wherein the first OLT is configured to transmit synchronization data through a gigabit passive optical network encapsulation method, GEM port corresponding to a predetermined GEM port identification or a logical link corresponding to a predetermined logical link identification (LLID); wherein the predetermined GEM port identification or the LLID, is dedicated for use for transmission of the synchronization data;
the ONU is configured to receive the synchronization data and store the synchronization data, and transmit the synchronization data to the second OLT without parsing the synchronization data, when a fault occurs on the first OLT or on a backbone optical fiber connected to the first OLT; and
the second OLT is configured to recover services according to the synchronization data when a fault occurs on the first OLT or on the backbone optical fiber connected to the first OLT.

14. A data synchronization system, comprising a first optical line terminal (OLT), a second OLT, and an optical network unit (ONU), wherein:
the first OLT is configured to transmit synchronization data through a gigabit passive optical network encapsulation method (GEM) port corresponding to a predetermined GEM port identification or a logical link corresponding to a predetermined logical link identification (LLID); wherein the predetermined GEM port identification or the LLID, is dedicated for use for transmission of the synchronization data;
the ONU is configured to return the synchronization data to the first OLT without parsing the synchronization data, after receiving the synchronization data; and
the second OLT is configured to obtain the synchronization data by interception, and recover services according to the synchronization data when a fault occurs on the first OLT or on a backbone optical fiber connected to the first OLT.

15. The system according to claim 14, further comprising an optical splitter, configured to receive the synchronization data returned by the ONU.

* * * * *